C. W. WHEELER.
CONTROLLER FOR ELEVATORS.
APPLICATION FILED MAR. 18, 1907. RENEWED MAY 16, 1910.
1,112,745.
Patented Oct. 6, 1914.
3 SHEETS—SHEET 1.
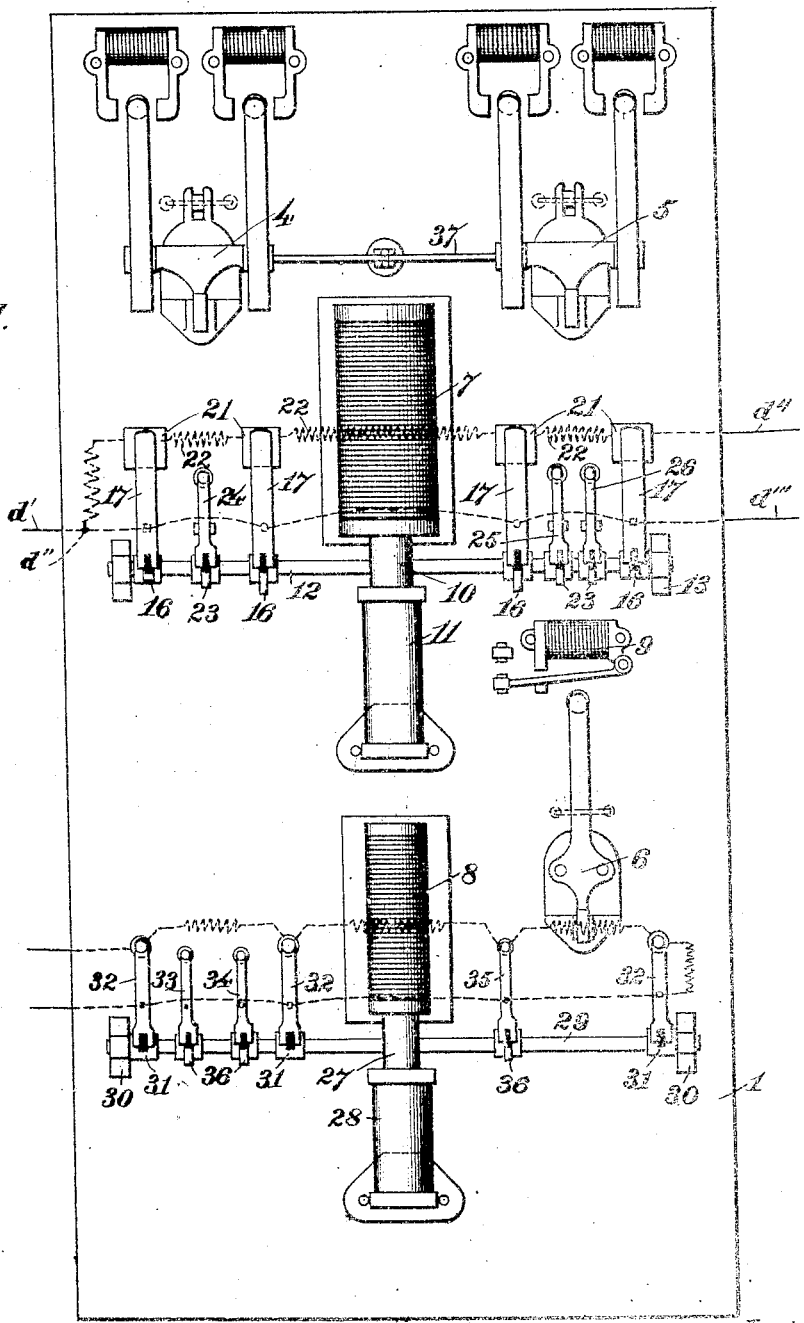

C. W. WHEELER.
CONTROLLER FOR ELEVATORS.
APPLICATION FILED MAR. 18 1907. RENEWED MAY 16, 1910.
1,112,745.
Patented Oct. 6, 1914.
3 SHEETS—SHEET 2.
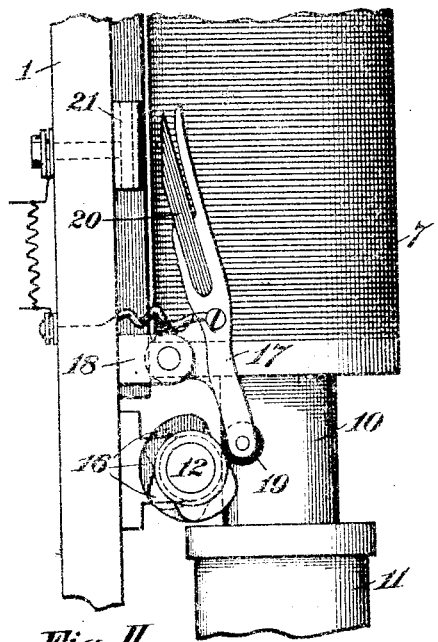
Fig. II.
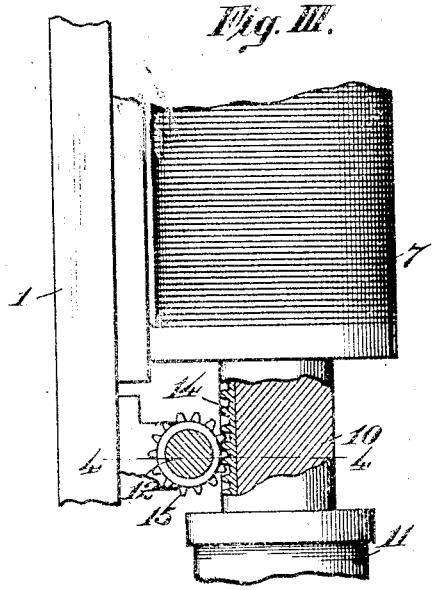
Fig. III.
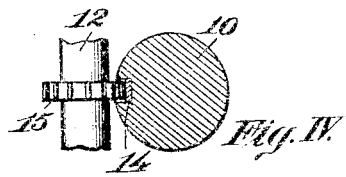
Fig. IV.
Fig. VI.
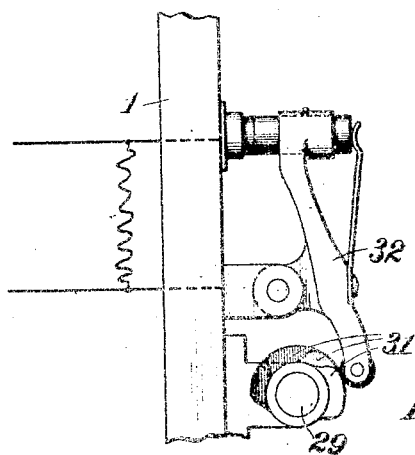
Fig. V.
Witnesses:
Inventor
Clarence W. Wheeler

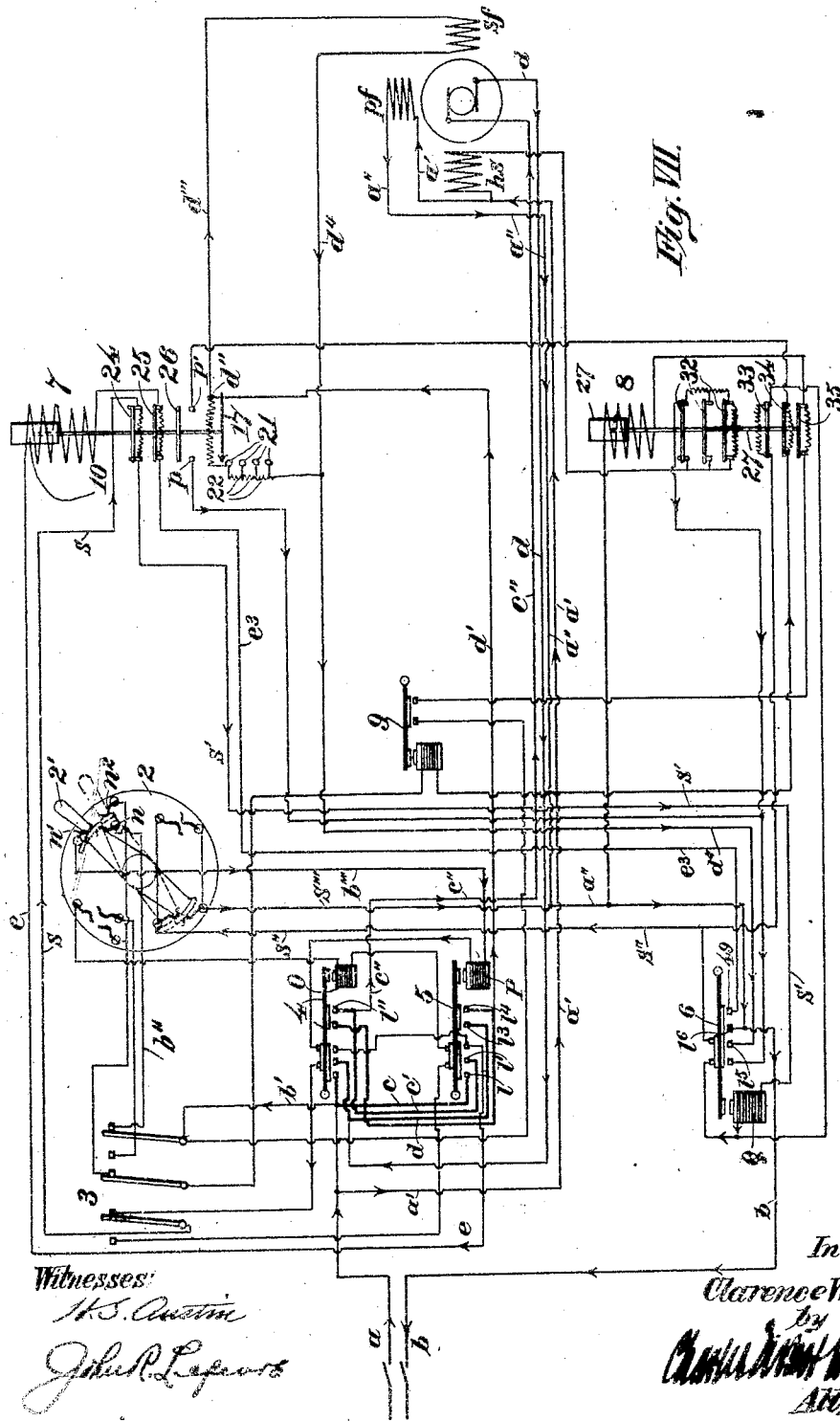

UNITED STATES PATENT OFFICE.

CLARENCE W. WHEELER, OF CHICAGO, ILLINOIS.

CONTROLLER FOR ELEVATORS.

1,112,745. Specification of Letters Patent. Patented Oct. 6, 1914.

Application filed March 18, 1907, Serial No. 362,979. Renewed May 16, 1910. Serial No. 561,719.

*To all whom it may concern:*

Be it known that I, CLARENCE W. WHEELER, a citizen of the United States, and a resident of Chicago, Cook county, Illinois, have invented certain new and useful Improvements in Controllers for Elevators, of which the following is a full, clear, and exact description, such as will enable others skilled in the art to which it appertains to make and use the same.

My invention relates to electric controllers and has particular reference to improvements in starters and controllers for the motors of electric elevators.

The object of my invention is to provide an improved and simplified starter and controller for electric motors; and with this object in view, my invention consists generally in the novel device hereinafter described and particularly pointed out in the claims.

My invention will be more readily understood by reference to the accompanying drawings, forming a part of this specification and in which—

Figure I is an elevation of a switch board equipped with a mechanism embodying my invention: Fig. II is a side elevation of a portion of the mechanism illustrated in Fig. I, the same comprising means for varying the resistance in the circuit of the starting field, and in several auxiliary circuits; Fig. III is a detail illustrating the means for operating said mechanism; Fig. IV is a section on the line 4—4 of Fig. 3; Fig. V is a side elevation of another portion of my device, the same constituting mechanism for automatically controlling the speed regulating field and for varying the resistance in the circuits of several auxiliary correlated circuits; Fig. VI is a detail plan view of one of the contact members shown in Fig. V; and Fig. VII is a diagram, illustrating the layout of an electric system equipped with my novel automatic controller, the latter being also shown in diagram.

As before stated my invention has reference to starters and controllers for motors of electric elevators, or the like, wherein the starting switch is at considerable distance from the motor switch board. The switch board is, in best practice, located near the motor and it is upon this that I locate the mechanism, embodying my invention.

Referring to the drawings, 1 indicates the switch board, located conveniently near the motor. The switch board, 1, carries all of the motor operating mechanism, with the exception of the starting switch, 2, which is located upon the car; and an automatic limit switch, 3, located near and operated by the cable winding drum, to operate a safety brake. This latter forms no part of the present invention, hence is only indicated conventionally in the drawings. Upon the switch board are located two magnet operating switches, 4 and 5, only one of which is in operation at a time, to govern the direction of rotation of the armature; a line or potential switch, 6, which closes the circuit of the motor and of the controlling mechanism, simultaneously with the closing of one of the aforementioned operating switches; an armature speed accelerating device operated by a solenoid, 7, which is excited instantaneously with the closing of the line switch, 6; a shunt field regulating device for increasing or decreasing the speed of the armature, and operated by a solenoid, 8, energized only after the speed accelerating device has operated throughout its limits; and an automatic magnetic switch, 9, for finally closing the circuit to the solenoid 8. These parts may be arranged in any convenient manner upon the switch board, 1, and none of them will require detailed description, with the exception of the armature speed accelerating device and the shunt field regulating device.

As before mentioned, the solenoid 7 is energized upon the closing of one of the switches 4 or 5, and the switch 6; that is, when said switches are closed, they close the circuit to said solenoid. The solenoid 7 is thus responsive to the closing and opening of the line switch, 6; hence the armature speed accelerating device, operated by said solenoid, is also directly responsive thereto.

10 indicates the solenoid core, the speed of which is controlled by a vacuum dash pot, 11. This dash pot, not only prevents sudden or uneven action of the core, but also serves to quickly return the core and the parts connected thereto, to initial position when the solenoid is deënergized. At right angles to the core 10 is an oscillatory shaft, 12, journaled in brackets, 13, upon the switch board, 1. This shaft is suitably connected to the core 10, so that reciprocation of said core will impart rotary oscillatory motion to the shaft. In Figs. III and IV I have illustrated a rack and pinion connection between said core and shaft. The rack, 14, is preferably made of a separate piece, and set into a groove formed in the side of the core 10; and the pinion, 15, which meshes therewith is rigidly secured to the shaft 12.

Besides the pinion, 15, the shaft 12 also carries a plurality of cams, 16, occupying different radial positions. These cams operate a like number of levers, 17, which are adapted to cut out resistance in a shunt circuit of the armature starting field, which weakens said field, to increase the speed of the armature. As the cams 16 occupy different radial positions on the shaft, the levers 17 are operated successsively, thus speeding up the armature gradually. For a better understanding of this portion of the device and its details, attention is directed particularly to Figs. I and II of the drawings. Each lever 17 is pivoted upon a bracket, 18, secured to the board, 1, and is equipped at one end with an anti-friction roller, 19, preferably of insulating material, to engage its respective cam 16. The opposite ends of the levers 17 are provided with yielding contacts 20 to engage a like number of contacts 21 upon the switch board, 1. The levers 17 are connected to the line leading to the starting field, whereas the contacts 21 are connected to a return line, resistances 22 being interposed between said contacts. In other words, the contacts 21 and interposed resistances 22 are arranged in parallel with the circuit of the starting field. When the motor armature is at rest the contacts 20 are held out of engagement with the contacts 21; but as soon as the solenoid 7 is energized by closing of the switches 2, 4 or 5, and 6, the levers are operated successively to cut out resistance in the shunt circuit, reducing the current in the starting field. Hence it will be seen that the armature starts into operation with a field of full strength, which field is gradually reduced in strength as the armature speed increases.

Besides the pinion, 15, and the cams 16, the shaft 12 also carries one or more cams 23 adapted to operate a like number of levers to close auxiliary circuits or to vary the resistance and hence the current therein. In the drawings I have shown three such levers; one lever, 24, increases the resistance in the circuit of the magnet which operates the switch 6, another, 25, increases resistance in the circuit of the solenoid 7, and another, 26, closes the circuit to the magnet switch 9, which in turn closes the circuit to the speed regulating solenoid 8. The levers, 17, 24, 25, and 26, are all loosely mounted in their respective brackets and but slight effort is required to operate them, as there is no frictional contact between the parts as is the usual case with most variable resistance devices. Hence it will be seen that the resistance to the movement of the core is slight and is practically uniform throughout its movement.

As much of the operation as has been briefly mentioned in describing the device thus far, takes place when the switch lever 2' is in the position shown in full lines in Fig. VII, and the speed at which the armature runs when the lever is in this position will be spoken of hereinafter as the normal running speed. If it is desired to run the armature at a greater speed, the lever 2' is thrown into the position shown in dotted lines in said figure. This may be done at once upon starting the machine, or the operator may wait until the armature has assumed its normal running speed. In either case, however, the speed varying solenoid 8 will not be excited until after the armature accelerating or starting solenoid 7 is actuated throughout its limits. To this end the magnet switch 9 is interposed in the circuit of the speed varying solenoid 8. As has been mentioned, this switch is actuated only at the end of the positive stroke of the solenoid core 10, after which, if the switch 2' is in the position noted in dotted lines, the core of the solenoid 8 will be actuated.

27 indicates the core of the solenoid 8, and 28, a vacuum dash pot which controls the movement of the core 27 in the same manner as the dash pot 11 controls that of the core 10. At right angles to the core 27 is a shaft, 29, rotatably mounted in brackets, 30, secured to the switch board, 1, and connected to and operated by the core 27 in a manner similar to the connection and the operation of the core 10 and the shaft 12 hereinbefore described. The shaft 29 carries a number of cams 31 which operate a like number of levers 32 to vary the resistance in the circuit of the high speed field of the armature. The variable resistance device, of which the levers 32 are a part, operate similarly to the armature speed accelerating device; however, as the variable resistance in this circuit is in series with the field, additional resistance is thrown into the circuit by the operation of the levers, instead of cutting out the resistance as in the aforementioned case. Besides the cams 31 the shaft 29 also carries a plurality of cams 36 for operating a like number of levers for inserting resistance into various solenoids. I have illustrated three such levers, 33, 34, and 35. The lever 33 throws further resistance into the circuit of the magnet which operates the switch 6; the lever 34 throws resistance into the circuit of the magnet of the switch 9; and the lever 35 throws resistance into the circuit of the solenoid 8 at the end of the stroke of its core 27.

For the sake of a better understanding of the hereindescribed preferred form of my device and its operation I will describe a motor system including the same. Referring to Fig. VII, the main line is indicated at $a-b$. Assuming that the current enters at $a$, it will pass through the line $a'$ to the permanent field coil $pf$, thence through the line $a''$ to the line wire $b$. This much of the circuit is always complete, whatever the position of the switches. When the switch lever $2'$ is moved to the position shown in full lines in Fig. VII, the current will pass from, $a$, through line $b'$ to the switch 3, thence through line $b''$ to the contact $n$ of the switch 2, thence to the contact $n'$, and through the line $b'''$ to a magnet P of the switch 5. This closes the switch 5, establishing the connections hereinafter described. From the magnet P the current passes to another arm of the switch 3, thence through line $s$ to one contact of the lever 24. This is now in the condition of least resistance. The current then passes through line $s'$ to the magnet Q which closes the switch 6. The closing of this switch is simultaneous with the closing of the switch 5. From the magnet Q the circuit is traced and completed by the line connected to the contact 34, thence by line $S''$, then by line $S'''$ and $a''$ to terminal connection with line $b''$.

By closing the switches 5 and 6, connections are established between the line and the armature and the starting field, which starts the armature in motion. The line to the starting field and the armature may be traced through the lines $a$ and $c$ to the contact $l$, through switch 5 to contact $l'$, thence through line $c'$ to contact $l''$, thence through line $c''$ to the armature, returning through line $d$ to contact point $l^3$, thence to contact point $l^4$, through line $d'$ to $d''$, and thence through $d'''$ to starting field $sf$. The circuit is completed through line $d^4$ to switch 6 which connects said line to the main line $b$ through contacts $l^5$ and $l^6$.

As before stated, the variable resistance device which regulates the starting field, and which is operated by the solenoid 7, is in parallel with the circuit of the starting field. Hence, as the core of the solenoid is actuated, the strength of the field is weakened to speed up the armature to normal running speed. In the diagram, I have illustrated the core as being lowered, when the solenoid is energized. This is done merely for the sake of clearness of illustration. The energization of the solenoid 7 takes place upon the closing of the switches 5 and 6 the circuit being established through line $c$ and line $e$ to the solenoid, and from thence through line $e^3$ to contact 49 of the switch 6, which connects it with the line $b$.

When the plunger 10 reaches the limit of its movement after the energization of the solenoid 7, the switch lever 26 connects the contacts $p\,p'$, as shown more clearly in Fig. VII. As before stated, the diagram of Fig. VII represents downward movement of the plunger 10 when the solenoid 7 is energized, although in the actual construction as shown in Fig. I when the solenoid 7 is energized the core 10 is moved upwardly. When the contacts $p\,p'$ are connected a circuit will be closed through the magnet of switch 9, beginning at the positive main and extending through conductor $b'$, contacts $n$ and $n^2$, limit switch, magnet of switch 9, conductor which is connected by the lever 34, contact $p'$, lever 26, contact $p$, and thence to the negative main through the switch 6. When switch 9 is operated the circuit is closed through the solenoid 8, which extends from the positive through conductor $b'$, switch 9, lever 35, solenoid 8, and thence to the negative main through switch 6. As soon as the solenoid 8 acts on its core 27 to move the same the levers 33 and 34 are actuated to insert resistance in the circuits of the magnets of the switch 9. After the plunger 27 has completed its stroke the lever 35 is permitted to be actuated to insert resistance in circuit with the solenoid 8. Less power is required to hold the solenoid core after it has completed its movement than is required to start it from its initial position. Therefore resistance is not inserted in circuit with the solenoids or magnet windings until after the plungers or armatures have completed their strokes. By inserting resistances in the solenoid and magnet winding circuits the heating of the windings is reduced to a minimum and the current consumption is reduced. Furthermore, when the current is cut off from the controlling circuits the parts are restored to initial position more quickly because of less tendency of the magnets and solenoids to hold the plungers and armatures in attracted position because the strength of the magnet has been reduced to a minimum. This is particularly important with respect to the rheostat solenoid 7, which by having the resistance inserted in circuit with it is maintained only sufficiently strong to hold the plunger up, but when the current is cut off the solenoid will immediately let go of the plunger so that the starting resistance can be reinserted without any delay whatever. It should also be noted that the resistance controlled by the lever 24 is inserted in the circuit containing the magnets O and P, so that when the current is cut off the reversing switches are immediately restored to initial position. As soon as the solenoid 7 releases its plunger 10 the starting resistance is reinserted and the resistance controlled by the lever 25 is not cut out until all or nearly all of the starting resistance has been reinserted. As before stated, much less current is required to hold the plunger in its uppermost position than to start it from its initial position and the arrangement is such that on the release of the plunger 10 it cannot be pulled up again by the solenoid 7 until the resistance controlled by the lever 25 has been cut out. At this time all the starting resistance has been reinserted, and since the resistance controlled by lever 25 is cut out the solenoid 7 could get sufficient current to again effect the cutting out of the starting resistance if desired.

The last part of the rotation of the shaft 12 closes the gap between the contact points $p$ and $p'$, which permits the relay 9 to be thrown into action as soon as the switch lever 2' is thrown into engagement with the contact $n^2$. The closing of the line at these two points completes the circuit to the magnet of the relay 9, which closes the line through solenoid 8 and the high speed field $hs$. The variable resistance operated by the solenoid 8 is in series with the high speed coil, therefore I construct this portion of the device so that the operation of the solenoid 8 will increase the resistance in said field, otherwise the action of the solenoid 8 is similar to that of the solenoid 7. The shaft 29, which is actuated by the solenoid 8 is equipped with cams which operate the resistance varying levers 33, 34, and 35 as before mentioned, one of which throws resistance into the circuit of the solenoid 8 by the completion of the stroke of its core, and another throws resistance into the circuit of the automatic magnetic switch 9.

To reverse the direction of rotation of the armature it is but necessary to throw the lever 2' to the opposite side of the switch box 2 (in the car). This will throw the magnet O of the switch 4 into operation instead of the magnet P of the switch 5. Otherwise the operation is identical with that hereinbefore described. The lay-out of the system illustrated is such that but one of the switch magnets O or P can be operated at a time. To insure the opening of one switch before the other is closed I prefer to connect the switches by a rock lever 37. By reference to Fig. I it will be seen that as the magnet of one switch is energized and the switch operated, the other switch will be thrown open by the lever 37.

Having thus described my invention what I claim as new and desire to secure by Letters Patent is:

1. In motor controlling apparatus, the combination with starting resistance, of automatic means for controlling the same, an electric motor having three field windings, one being permanently connected across the mains, and another being in parallel with the starting resistance, resistance in circuit with said third field winding, and means for controlling said last named resistance to vary the strength of said third field winding.

2. In motor controlling apparatus, the combination with an electro-magnetic rheostat, of an electric motor having three field windings, one being permanently connected across the mains, and another being connected in parallel with the starting resistance of said rheostat, an electro-magnetic rheostat for the third field winding of said motor, and circuits and connections for effecting the automatic and successive operation of said electro-magnetic rheostats.

3. In motor controlling apparatus, the combination with an electro-magnetic rheostat, of an electric motor having three field windings, one being connected permanently across the mains, and another being in parallel with the starting resistance of said rheostat, electro-magnetic reversing switch mechanism for the motor, an electro-magnetic rheostat for the third field circuit, an electro-magnetic main line switch, an electro-magnetic relay for controlling the third field circuit rheostat, a manual switch for controlling directly said reversing switch mechanism, said electro-magnetic relay and said electro-magnetic main line switch, and circuits and connections for effecting the automatic operation of the reversing switch mechanism, main line switch and the first named electro-magnetic rheostat when the manual switch is in one position, and when in another position the additional operation of the electro-magnetic relay and the third field circuit rheostat after the first named electro-magnetic rheostat has performed its operation of cutting out the starting resistance and the second field winding.

4. In elevator motor controlling apparatus, the combination with an electric motor having a field winding, of starting resistance for said motor, switches for controlling said resistance, electro-magnetic means to positively close said switches, field resistance, electro-magnetic mechanism for controlling said resistance to vary the field strength of the motor, a master switch for controlling the said electro-magnetic means, a relay interposed between said master switch and said electro-magnetic mechanism, and means for preventing said electro-magnetic mechanism from operating until substantially all of the starting resistance has been cut out.

5. In a device of the class described, a motor having three field circuits, in combination with two variable resistance devices, one variable resistance device being associated with each of two of said field circuits, means for operating said variable resistance devices automatically and successively, an elevator car switch for controlling said operating means so as to effect the operation of one variable resistance device when in one position and of both successively and automatically when in another position, and a relay interposed between said car switch and one of said operating means.

6. The combination with an electric motor having a field winding and an armature circuit, a variable resistance device for the armature circuit, of electromagnetic mechanism for operating said resistance device to effect the acceleration of the motor at starting, an additional resistance device for the field circuit, additional electro-magnetic mechanism for operating the last named resistance device to effect an increased speed of the motor or a decreased speed thereof, an elevator car switch for controlling both of said electromagnetic mechanisms and having an intermediate speed position and a fast speed position, and circuits and connections to effect a successive and automatic operation of the variable resistance device for the armature and the variable resistance device for the field circuit in the order named.

7. In a device of the class described, the combination with a motor having a slow speed field circuit and a high speed field circuit, of starting resistance in parallel with the slow speed field circuit, speed resistance in circuit with said high speed field circuit, an electromagnet and switches for cutting out said starting resistance and said slow speed field circuit, an additional electromagnet and switches for controlling said speed resistance by inserting the same in circuit with said high speed field circuit or cutting it out therefrom, an elevator car switch having two speed positions, and circuits and connections effecting the cutting out of the starting resistance and the slow speed field circuit when the switch is in one position and for effecting the operation of the second named electro-magnet and switches when the said car switch is in its other position, but permitting the automatic increase of speed to maximum to take place only after substantially all the starting resistance has been cut out.

8. In a device of the class described, the combination with a rock shaft, of a plurality of cams thereon, switches positively operated by said cams, starting resistance controlled by said switches, an electric motor, a solenoid and plunger with connections for operating said rock shaft, additional resistance connected to the motor field winding, an additional rock shaft, cams thereon, switches operated by said cams, solenoid plunger and connections for controlling said field resistance, an elevator car switch connected to said solenoids, and circuits and connections for effecting the successive and automatic operation of said solenoids and parts operated thereby to effect an acceleration of the motor to intermediate speed and increase of speed to full speed when the car switch is in one position and to effect the operation of only the first named solenoid when the car switch is in slow speed position.

9. In motor controlling apparatus for elevators, the combination with an electric motor, of sectional starting resistance therefor, electro-magnetic means for cutting out said resistance, reversing switch mechanism, a car switch for controlling said reversing switch mechanism and said electro-magnetic means, additional resistance in circuit with the field winding, an electro-magnet for controlling said additional resistance, a relay interposed between the car switch and the last named electro-magnet, and means for effecting the automatic and successive operation of cutting out the starting resistance and inserting the field resistance when the car switch is in a predetermined position.

10. In motor controlling apparatus for elevators, the combination with an electric motor, of reversing switch mechanism therefor, an electro-magnetic rheostat for the armature circuit of the motor, a main line potential switch, an elevator car switch, an additional magnetic rheostat for the field circuit of the motor, and circuits and connections for effecting the simultaneous operation of the reversing switch mechanism and the main line potential switch, and also effecting the operation of the electro-magnetic rheostat for the armature circuit of the motor to accelerate the speed thereof to an intermediate point and compelling the electro-magnetic rheostat for the field circuit to operate automatically after said first named rheostat has substantially completed its operation.

11. In elevator motor controlling apparatus, the combination with an electric motor, of reversing switch mechanism therefor, an electro-magnetic rheostat for the armature circuit of the motor, an electro-magnetic main line potential switch, an elevator car switch having a slow speed and a fast speed position for each direction of rotation of the motor, an electro-magnetic rheostat for the field circuit of the motor, a relay interposed between the elevator car switch and the field rheostat, a switch associated with said first named rheostat for preventing the second named rheostat from operating until the first named rheostat has substantially completed its operation, and connections between the car switch and said electro-magnetic rheostat to effect the operation of the armature rheostat when the car switch is in slow speed position and the operation of both the armature rheostat and the field rheostat successively and automatically in the order named when the car switch is in fast speed position.

12. In elevator motor controlling apparatus, the combination of an electric motor, of an electro-magnetic rheostat for the armature circuit of said motor, electro-magnetic reversing switch mechanism for the motor, an electro-magnetic rheostat for inserting or withdrawing resistance from the shunt field circuit of the motor at will during the operation of the motor, an electro-magnetic main line switch, a manual car switch connected to said electro-magnetic rheostat, electro-magnetic reversing switch mechanism, and electro-magnetic main line switch; an electro-magnetic relay interposed between said car switch and said electro-magnetic field rheostat, a switch associated with said electro-magnetic armature rheostat to prevent the operation of the electro-magnetic field rheostat until after said armature rheostat has operated to cut out substantially all the starting resistance, and connections affording the car switch two speed positions in one of which the armature rheostat only is operated and in the other of which both the armature rheostat and field rheostat are operated automatically and successively, the field rheostat being restored to initial position and the motor slowed down to intermediate speed when the car switch is moved from its high speed position to its intermediate speed position.

13. In motor controlling apparatus, the combination with starting resistance, of automatic means for controlling the same, an electric motor having three field windings, one being a shunt field winding connected across the mains, and another being in parallel with the starting resistance, resistance in circuit with the third field winding, and means for controlling the field resistance to vary the strength of said third field winding.

14. In an elevator motor controlling system, the combination with an electric motor having three field windings, one being an independent shunt field circuit, another being connected to the starting resistance, resistance connected to the third field winding, starting resistance for the armature circuit, switches connected to said starting resistance, cams for operating said switches, a rock shaft for operating the cams, a solenoid and plunger for actuating said rock shaft, reversing switch mechanism for the electric motor, an electro-magnetic main line potential switch, switches connected to said field resistance, cams for operating said switches, a rock shaft carrying said cams, an electro-magnet for actuating said rock shaft, a switch preventing the operation of said electro-magnets until all of said starting resistance has been cut out, a manual car switch having two speed positions, in one of which the automatic cutting out of said starting resistance is effected, and in the other of which the automatic operation of said field resistance is effected after said starting resistance has been cut out, and an electro-magnetic relay interposed between said car switch and said electro-magnet for controlling the field resistance, the field resistance being restored to initial position to effect the slowing down of the motor to intermediate speed when the car switch is moved from high speed position to intermediate speed position.

In testimony whereof, I have hereunto set my hand, this 8th day of March, 1907, in the presence of two subscribing witnesses.

CLARENCE W. WHEELER.

Witnesses:
H. S. AUSTIN,
A. W. NELSON.